Sept. 9, 1969 R. M. BROWN 3,466,469
TIMING CIRCUIT
Filed Aug. 19, 1966
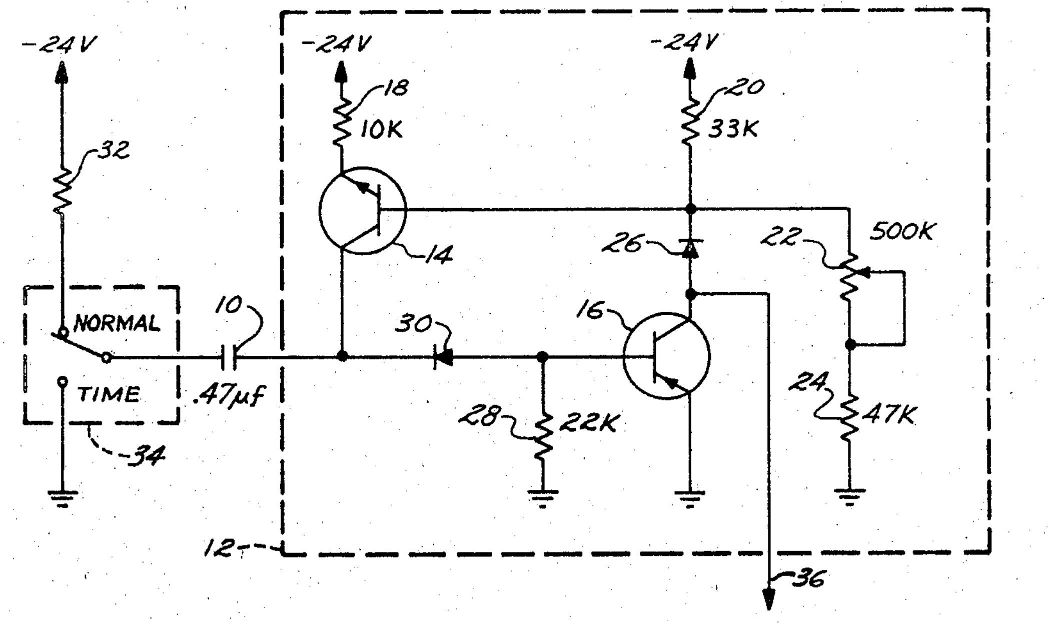
INVENTOR
ROBERT M. BROWN
BY
ATTORNEY

United States Patent Office 3,466,469
Patented Sept. 9, 1969

3,466,469

TIMING CIRCUIT

Robert M. Brown, Arlington County, Va., assignor to The Susquehanna Corporation, a corporation of Delaware Filed Aug. 19, 1966, Ser. No. 573,620

Int. Cl. H03k *17/26, 17/28*

U.S. Cl. 307—293 4 Claims

ABSTRACT OF THE DISCLOSURE

An example of the timing circuit includes a timing capacitor connected to a regenerative switch. This switch is formed by a PNP–NPN transistor pair. A variable voltage divider is connected to the base of one transistor so that it functions as a constant-current source. This results in a linear discharge of the capacitor and, accordingly, precise timing periods can be obtained. The regenerative action of the transistor pair gives a precise indication of the end of the timing period.

The present invention relates to a timing circuit, and more particularly to a linear timing circuit.

It is well-known in RC timing circuits to use a constant-current technique to obtain linearity. The charging of the capacitor is controlled by current flow through a transistor and the charging time can be varied by varying the bias on the base of the transistor. The outputs of these timing circuits respond to a predetermined voltage level at the capacitor. The output circuits, however, are generally slow-acting or if designed to be fast-acting, entail the addition of extra circuitry such as buffer stages to attain the desired fast switching.

The timing circuit of the present invention provides a fast-acting output circuit which not only avoids the necessity of adding extra circuitry but also participates in the charging and discharging of the timing capacitor and gives a linear timing capability. Generally, the circuit contains a timing capacitor having at its output a pair of transistors of opposite conductivity. During the timing period, the capacitor discharges through one of the transistors which, by serving as a constant-current source, permits linear discharge of the capacitor. When the charge on the capacitor drops to a predetermined level, the pair of transistors through regenerative action saturate immediately and signal the end of the timing period. The timing period is controllable by varying the conductivity of the transistor which serves as a constant current source.

An object of the present invention is to provide an improved linear timing circuit whose linearity is obtained by the functioning of its output portion as a constant current source.

An additional object of the present invention is to provide such a circuit in which the timing period duration is controllable by the output portion.

A further object is to provide such a circuit having a simplified output circuit portion which additionally provides fast switching to signal the termination of the timing period.

Other objects and advantages of the present invention will become apparent by the reading of the following specification in conjunction with the sole figure which presents the preferred embodiment of the present invention in schematic form.

The timing capacitor 10 is connected to the output circuit 12 which serves both to control the discharge of the capacitor 10 as well as provide fast switching at the termination of the timing period. This circuit 12 is also in the charge path of capacitor 10. Within circuit 12 is a pair of opposite conductivity transistors 14 and 16. Transistor 14 is of NPN construction while transistor 16 is PNP.

These transistors are connected in a regenerative fashion with the base of each connected to the collector of the other. The emitter of transistor 14 is connected to negative battery through resistor 18 while the emitter of transistor 16 is connected to ground. At the input, capacitor 10 is connected to the junction of the collector of transistor 14 and the base of transistor 16. Connected to the junction of the base of transistor 14 and the collector of transistor 16 is a voltage divider consisting of resistor 20, variable resistor 22, and resistor 24.

The output of the output circuit 12 is shown as taken from the collector of transistor 16 on line 36. Diode 26 is provided to isolate the voltage divider from negative potentials which might appear on the output line 36. Resistor 28 functions as a biasing resistor for the transistor 16, and diode 30 isolates resistor 28 and transistor 16 during discharge of capacitor 10. The means for charging capacitor 10 is represented in simplified form as negative battery, resistor 32 and a switch 34. In the Normal position of switch 34, the battery is connected to the left side of capacitor 10. In the Time position of switch 34, the left side of capacitor 10 is grounded. Switch 34 can be, for example a relay or a transistor switch.

With switch 34 in the Normal position, the construction of circuit 12 is such that a conductive state is established where transistors 14 and 16 are saturated. The output line 36 is at approximately ground potential. Capacitor 10 has been fully charged via battery, resistor 32, the Normal position of switch 34, capacitor 10, forward-biased diode 30, and the base-emitter path of conducting transistor 16 to ground. A negative charge is stored on the left side of capacitor 10. When switch 34 is actuated at the beginning of the timing period by the movement of the contact to the Time position, the left side of capacitor 10 is grounded and the right side of capacitor 10 goes positive in an amount equal to the prior negative charge on its left side. With a positive input now being applied to circuit 12, the diode 30 becomes reverse-biased and transistor 16 cuts off. The voltage at the base of transistor 14 is now determined by the voltage divider consisting of resistors 20, 22, and 24. Accordingly, the emitter voltage of transistor 14 is held at a constant value and the voltage drop across emitter resistor 18 is constant. Transistor 14 now acts as a constant current source for the discharge of capacitor 10. The circuit 12 is in its second conductive state. Capacitor 10 now discharges through transistor 14 linearly rather than exponentially as in ordinary RC circuit. The discharge path is from negative battery, resistor 18, transistor 14, capacitor 10, the Time position of switch 24, and ground.

As capacitor 10 completes its discharge, diode 30 becomes forward-biased, and transistor 16 begins to conduct. The collector of this transistor begins its drop toward ground potential and the base of transistor 14 follows. Accordingly, transistor 14 begins to conduct more, and its collector becomes more negative. This increase in negative potential at the base of transistor 16 causes it to conduct more heavily and its collector to come closer to ground. This regenerative operation of transistors 14 and 16 continues and both transistors become saturated almost instantaneously. Circuit 10 has now returned to its first conductive state. The output line 36, which follows the potential at the collector of transistor 16, goes to substantially ground potential and presents a precise, affirmative indication that the timing period is complete by virtue of this sharp change in output signal.

The variability of resistor 22 premits control of the level of current flow through transistor 14 when it is in its constant current mode. However, linearity of discharge is retained and therefore precise timing periods can be set. For example, with the circuit values as shown, a charge of about 22.5 volts on capacitor 10 and a setting of 500K ohms at resistor 22, a timing period of 160 ms. is obtained. With resistor 22 set to zero ohms, a timing period of 9 ms. is obtained. Settings between zero and 500K ohms will vary the discharge time between the above two timing limits. Thus, a wide range of timing periods or time delays can be obtained. If other ranges are desired, circuit values can be changed. For example, capacitor 10 can be replaced by a larger or smaller capacitor. Additional ranges can also be obtained by adjustment of the voltage divider ratio of the three resistors 20, 22, and 24. Care must be taken that the ratio is not chosen such that the adjustment of resistor 22 towards its selected maximum value so lowers the value of the constant current through transistor 14 that it falls below the minimum value of current required to turn on transistor 16 at the end of the timing period. For the circuit values shown herein, the minimum current attainable through transistor 14 is sufficient to turn on transistor 16 at the end of the timing period.

When switch 34 is reset to the normal position, capacitor 10 recharges during what is known as the recovery period. It is advantageous to have as short a recovery period as is possible and this can obviously be attained by using a capacitor 10 and resistor 32 of small value. This is in keeping with one advantage of a constant current discharge in that relatively long timing periods can be achieved with capacitors of small value. To attain equivalent timing periods in conventional RC discharge circuits would require the use of larger-valued capacitors, by comparison. Large capacitors are relatively expensive and are not manufactured with as close tolerance as are the smaller capacitors and are also more susceptible to temperature changes.

While but one preferred embodiment of the present invention has been particularly shown and described, it is apparent that various changes may be made in the construction and arrangement of the invention and in the substitution of equivalents without departing from the spirit and scope of the invention as claimed. For example, one obvious variation would be to utilize the output on line 36 to reset switch 34 at the termination of the timing period. The recovery period would follow the end of the timing period, and capacitor 10 and circuit 12 would be immediately prepared for the next actuation of switch 34.

What is claimed is:

1. A timing circuit for providing linear timing periods comprising:

(1) a storage capacitor for accumulating a charge and thereafter during a timing period to discharge, (2) an output circuit for providing a first output condition during said timing period and a second output condition at the termination of said timing period, said output circuit including:

(A) a pair of transistors, each being of opposite conductivity type to the other, each transistor having an:

(a) emitter, (b) collector, (c) base, (d) said pair of transistors connected to function as a regenerative switch to abruptly switch the output of said output circuit from said first to said second output condition when the charge on said storage capacitor discharges to a predetermined level, thereby to signal the termination of said timing period;

(B) a voltage divider connected to the base of one of said transistors for establishing a constant current discharge rate for said storage capacitor during said timing period:

(a) said voltage divider being variable so that a plurality of constant current discharge rates and thereby a plurality of timing periods can be provided;

(3) said storage capacitor being connected to said output circuit at the collector of said one transistor whereby said transistor serves as a constant current discharge path during said timing period.

2. A timing circuit as claimed in claim 1 wherein said output circuit further includes biasing means for said pair of transistors for holding said pair in a saturated conducting state to provide said second output condition.

3. A timing circuit as claimed in claim 2 wherein said output circuit further comprises a diode connected between the collector of said one transistor and the base of said other transistor to isolate said other transistor during discharge of said capacitor.

4. A timing circuit as claimed in claim 2 wherein the other transistor in said pair is connected in the charge path of said capacitor when said pair of transistors is in a saturated conducting state.

References Cited

UNITED STATES PATENTS

| | | | |
|---|---|---|---|
| 2,949,545 | 8/1960 | White | 307—293 |
| 3,193,701 | 7/1965 | Lawhon | 307—293 XR |
| 3,292,005 | 12/1966 | Lee | 307—293 XR |
| 3,286,200 | 11/1966 | Foulger | 307—235 XR |
| 3,364,365 | 1/1968 | Eisenhauer | 307—235 XR |
| 3,374,366 | 3/1968 | Kleinberg | 307—255 XR |

JOHN S. HEYMAN, Primary Examiner

JOHN ZAZWORSKY, Assistant Examiner

U.S. Cl. X.R.

307—246, 255